(12) United States Patent
Cawthorne et al.

(10) Patent No.: US 9,583,986 B2
(45) Date of Patent: Feb. 28, 2017

(54) POWER GENERATOR FOR A HYDRO TURBINE

(71) Applicant: OPENHYDRO IP LIMITED, Hanover Quay, Dublin (IE)

(72) Inventors: Simon Cawthorne, Carlingford (IE); Edward Spooner, Durham (GB)

(73) Assignee: Openhydro IP Limited (IE)

( * ) Notice: Subject to any disclaimer, the term of this patent is extended or adjusted under 35 U.S.C. 154(b) by 0 days.

(21) Appl. No.: 14/437,638

(22) PCT Filed: Oct. 29, 2013

(86) PCT No.: PCT/EP2013/072577
§ 371 (c)(1),
(2) Date: Apr. 22, 2015

(87) PCT Pub. No.: WO2014/067928
PCT Pub. Date: May 8, 2014

(65) Prior Publication Data
US 2015/0280506 A1 Oct. 1, 2015

(30) Foreign Application Priority Data
Oct. 31, 2012 (EP) .................................... 12190731

(51) Int. Cl.
*F03B 13/00* (2006.01)
*H02K 3/28* (2006.01)
(Continued)

(52) U.S. Cl.
CPC .............. *H02K 3/28* (2013.01); *F03B 13/10* (2013.01); *F03B 13/26* (2013.01); *H02K 1/165* (2013.01);
(Continued)

(58) Field of Classification Search
CPC .... H02K 7/1823; H02K 3/28; H02K 2203/15; H02K 16/04; F03B 13/26; F03B 13/10
(Continued)

(56) References Cited

U.S. PATENT DOCUMENTS 5,281,094 A * 1/1994 McCarty ................. B64C 11/44
318/722
9,013,082 B2 * 4/2015 Ge ........................... H02K 1/27
310/114
(Continued)

FOREIGN PATENT DOCUMENTS

GB      2462257 A    2/2010
GB      2488129 A    8/2012
(Continued)

OTHER PUBLICATIONS

International Search Report for PCT/EP2013/072577, mailed Feb. 18, 2014, pp. 1-3.

*Primary Examiner* — Julio Gonzalez Ramirez
(74) *Attorney, Agent, or Firm* — Tarolli, Sundheim, Covell & Tummino LLP

(57) ABSTRACT

A power generator for a hydro turbine is axially coupled to the hydro turbine. The generator comprises a rotor arranged to rotate about an axis in response to fluid flow through said turbine. A first stator structure incorporates at least a first winding disposed circumferentially around the axis and axially displaced in a first inboard direction from the rotor. A second stator structure incorporates a least a second winding disposed circumferentially around the axis and axially displaced in a second outboard direction from the rotor, the rotor being arranged to electrically couple with the windings.

15 Claims, 9 Drawing Sheets

(51) Int. Cl.
  *H02K 1/16* (2006.01)
  *H02K 7/18* (2006.01)
  *H02K 16/04* (2006.01)
  *F03B 13/10* (2006.01)
  *F03B 13/26* (2006.01)
(52) U.S. Cl.
  CPC ........... *H02K 7/1823* (2013.01); *H02K 16/04* (2013.01); *H02K 2203/15* (2013.01); *Y02E 10/38* (2013.01)
(58) Field of Classification Search
  USPC ...................................................... 290/43, 54
  See application file for complete search history.

(56) References Cited

U.S. PATENT DOCUMENTS

| | | |
|---|---|---|
| 2005/0275359 A1 | 12/2005 | Takeuchi et al. |
| 2006/0001269 A1* | 1/2006 | Jansen ...................... F03D 9/00 290/44 |
| 2006/0022553 A1* | 2/2006 | Nakayama ............. H02K 1/272 310/268 |
| 2007/0108865 A1* | 5/2007 | Jansen ................... H02K 1/146 310/266 |
| 2009/0021224 A1* | 1/2009 | Regazzi .................... H02P 9/48 322/28 |
| 2009/0206686 A1* | 8/2009 | Vollmer ................. H02K 16/04 310/49.46 |
| 2010/0007225 A1* | 1/2010 | Platon ...................... H02K 1/14 310/45 |
| 2010/0025995 A1* | 2/2010 | Lang .................. H02M 5/4505 290/44 |
| 2010/0133816 A1 | 6/2010 | Abolhassani et al. |
| 2011/0074243 A1* | 3/2011 | Liang ..................... H02K 1/165 310/216.112 |
| 2012/0218710 A1* | 8/2012 | Ioannidis ............... H05K 7/209 361/697 |
| 2013/0292941 A1* | 11/2013 | Mountain .............. H02K 16/04 290/7 |
| 2015/0028590 A1* | 1/2015 | Wamble, III .......... B60L 13/04 290/43 |
| 2015/0295482 A1* | 10/2015 | Cawthorne ............ H02K 1/165 310/12.15 |

FOREIGN PATENT DOCUMENTS

| | | |
|---|---|---|
| WO | 2008014584 A1 | 2/2008 |
| WO | 2012059109 A2 | 5/2012 |

* cited by examiner

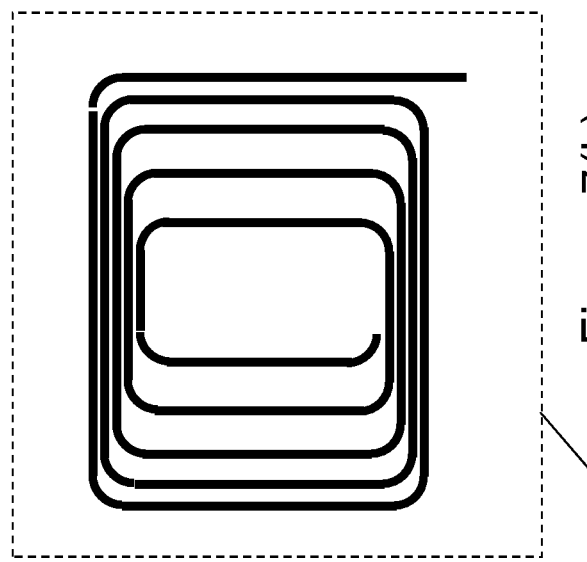
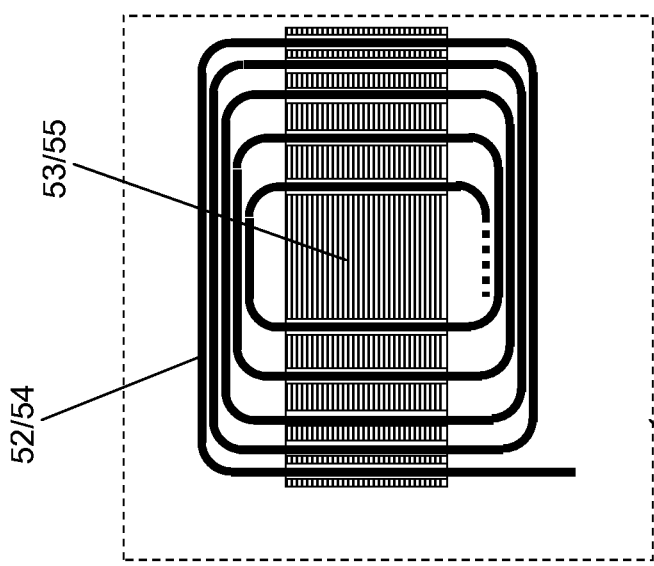
Figure 7(b)
Figure 7(a)

… (c). When this is done, the magnetic force of
POWER GENERATOR FOR A HYDRO TURBINE

RELATED APPLICATIONS

The present invention is a U.S. National Stage under 35 USC 371 patent application, claiming priority to Serial No. PCT/EP2013/072577, filed on 29 Oct. 2013; which claims priority from European Application No. 12190731.5, filed 31 Oct. 2012, the entirety of both of which are incorporated herein by reference.

FIELD

The present invention relates to a power generator for a hydro turbine.

BACKGROUND

In many types of electrical machine, electric currents in a stator create a travelling magnetic field that interacts with a set of electric currents, a set of permanent magnets or a set of ferromagnetic features on the moving part of the machine, i.e. a rotor in the case of a rotary machine, or a translator in the case of a linear machine. The usual method of creating the travelling field is to use three component windings housed together in a uniform array of slots in a laminated iron stator and fed with three alternating currents from a three-phase electrical power supply. Each component winding has a cyclic distribution of coils and the three component windings are placed with their magnetic axes spaced at intervals of ⅓ of a wavelength along the stator. The alternating currents fed to the windings have relative phase differences of 120 degrees. As a result, the combined magnetic flux approximates a sinewave of constant amplitude travelling at a speed equal to one wavelength of the cyclic distribution during one cycle of the alternating current. Other polyphase windings are possible but are seldom used because the prevalent form of power supply is the three-phase type.

The most common type of electrical drive, the three-phase induction motor of the type used in many industrial applications, employs this method to produce a rotating field. Referring to FIG. 1(a), a rotor 12 carries a set of conducting bars (not shown) in which electric currents are induced and which interact with the rotating field to produce torque on an output shaft.

In domestic and light industrial applications, where a three-phase electrical supply is not available, an alternative arrangement is used whereby two component windings are supplied with alternating currents differing in phase. The first current is provided directly by an available single-phase supply and the second is obtained from the same supply usually via a capacitor that introduces a phase shift. The phase shift is of the correct degree only under one load condition so under most conditions the operation of such motors is not ideal. Such machines are referred to as single-phase motors because they operate from a single-phase supply but the windings are more accurately described as two-phase windings. If a balanced two-phase supply providing two currents displaced in phase by 90 degrees were available, electrical machines of this type with component windings displaced by ¼ of the wavelength would create a rotating field of constant amplitude and could be just as effective as standard three-phase machines.

In recent years, linear electric motors have attracted interest for several applications including guided ground transport and for electromagnetic launch systems on aircraft carriers. Also linear generators have been used in certain wave-power devices relying on reciprocating movement. A linear electrical machine can be considered as a standard rotary machine that has been cut and un-rolled, as shown in FIGS. 1(a) . . . (c). When this is done, the magnetic force of attraction indicated by the force lines 16 between stator 10 and translator 14 is no longer balanced by equal and opposite forces as in the case of the stator 10 and rotor 12.

A common approach to overcome this problem is to use two stators 10',10" placed on opposite sides of a single translator 14 as shown in FIG. 2. In most cases magnetic flux 18 passes from the first stator 10', through the translator 14, through the second stator 10", and through the translator for a second time to complete its circuit.

The two-stator linear machine could be rolled up around the original axis (shown as A in FIG. 1(b)) to form a rotary machine with two co-axial stators enclosing a hollow cylindrical rotor and with magnetic flux passing radially from the inner stator, through the inner gap, the cylindrical rotor and the outer gap to the outer stator. Machines of this configuration have applications in servo control systems where a drive of very low inertia is required.

Alternatively, the linear machine may be rolled up around an axis orthogonal to the original axis (shown as B in FIG. 2) to create a rotary machine where the flux passes axially across two planar airgaps rather than radially through cylindrical airgaps. Axial-flux rotating machines of this type have been used particularly as permanent-magnet generators for renewable energy applications, notably small wind turbines. In such cases each of the two stators normally carries a three-phase winding comprising three component windings as described above.

It is an object of the present invention to provide for improved power generation within a hydro turbine.

SUMMARY

According to the present invention there is provided a power generator for a hydro turbine as claimed in claim 1.

In embodiments of the invention, each of the two-stators has single phase windings in which one component winding is housed in each stator and the two component windings are aligned with their magnetic axes displaced by approximately 90 electrical degrees.

The displacement between the magnetic axes of the two windings is ideally 90° and the windings are ideally supplied with alternating currents that differ in phase by 90°. Each stator carries a single winding and this removes the restrictions caused by each winding having to share a common array of slots. As a result:

1. The winding distribution can be arranged to approximate closely to a sinusoidal pattern because the slots no longer need to be uniformly distributed and can be distributed according to the requirements of just the one winding housed in them.
2. The winding layout is simplified because the winding does not need to overlap other windings and so it may be a straightforward set of planar coils in the case of a linear machine or an axial-flux rotary machine
3. The insulation is simpler because the winding needs only to be isolated from ground and not from other windings.
4. As a consequence of 2 and 3 it becomes practicable to form each winding from a continuous length of insulated cable. For undersea applications, this is especially beneficial as it simplifies the waterproofing the stator electrics as all winding connections can be readily made within a single sealed unit.

Within the electrical machine, the rotor may be an annular sheet of conductor so that the machine operates as an induction motor or generator. Such an induction generator is tolerant to hypocycloidal motion produced by movement of a shaftless rotor within a turbine of the type shown in FIGS. 3-5. The annular sheet may also include ferromagnetic parts to assist the passage of magnetic flux between the two stator structures. Alternatively, the rotor may comprise an array of permanent magnets so that the machine operates as a permanent-magnet synchronous motor or generator.

The two windings may be fed from a two-phase electrical source or, in the case of a generator, they may feed into a two-phase load. A two-phase source may be provided by:
1. a special-purpose two-phase alternator;
2. a power-electronic converter with two-phase output, such as may be arranged using two H-bridges using IGBTs and connected to a common dc link;
3. a three-phase source with a set of transformers connected to convert between three-phase and two-phase systems, such as a Scott-T connected transformer; or
4. a single-phase source with a phase-shifting impedance as used in a single-phase motor.

A two-phase load for a generator may employ one of the above arrangements operating with reversed power flow or it may comprise simply resistive load banks.

In the case of a large-diameter rotary machine, it is preferred to divide the stators into a number of manageable sections. The sections may be a set of arcs disposed around the machine or alternatively if a large number of sections is used, then in the case of an axial-flux machine it may be convenient and more cost effective to make the sections straight and disposed tangentially. If the sections are spaced apart, then the emfs in their windings differ in phase. If the distance between sections is ⅓ of a wavelength then the phase difference is 120 degrees and if the stator has been divided by a multiple of three, then a three-phase supply can be used to supply the sections of one stator. If the distance is ⅙ of a wavelength then a three-phase source may be used with the windings of alternate blocks reversed. In either case, a second three-phase supply with its three outputs in phase quadrature with those of the first three phase supply can be used to supply the sections of the second stator. If the windings of the sections of the first stator are connected in star, then the required second three-phase supply can be provided by connecting the windings of the second stator in delta and to the same three-phase source. In this way a standard three-phase source can be used. It is noted that the voltage applied to the windings connected in delta is higher than the voltage applied to the windings connected in star and the current is less. The windings of the two stators are therefore preferably arranged to operate at different voltage and current by specifying proportionately different numbers of turns of conductor of different cross section.

BRIEF DESCRIPTION OF THE DRAWINGS

Embodiments of the invention will now be described, by way of example, with reference to the accompanying drawings, in which:

FIGS. 7(a) and (b) show in detail the layout of windings for a pole of the stator of FIG. 6;

DESCRIPTION OF THE PREFERRED EMBODIMENTS

Figure 1:
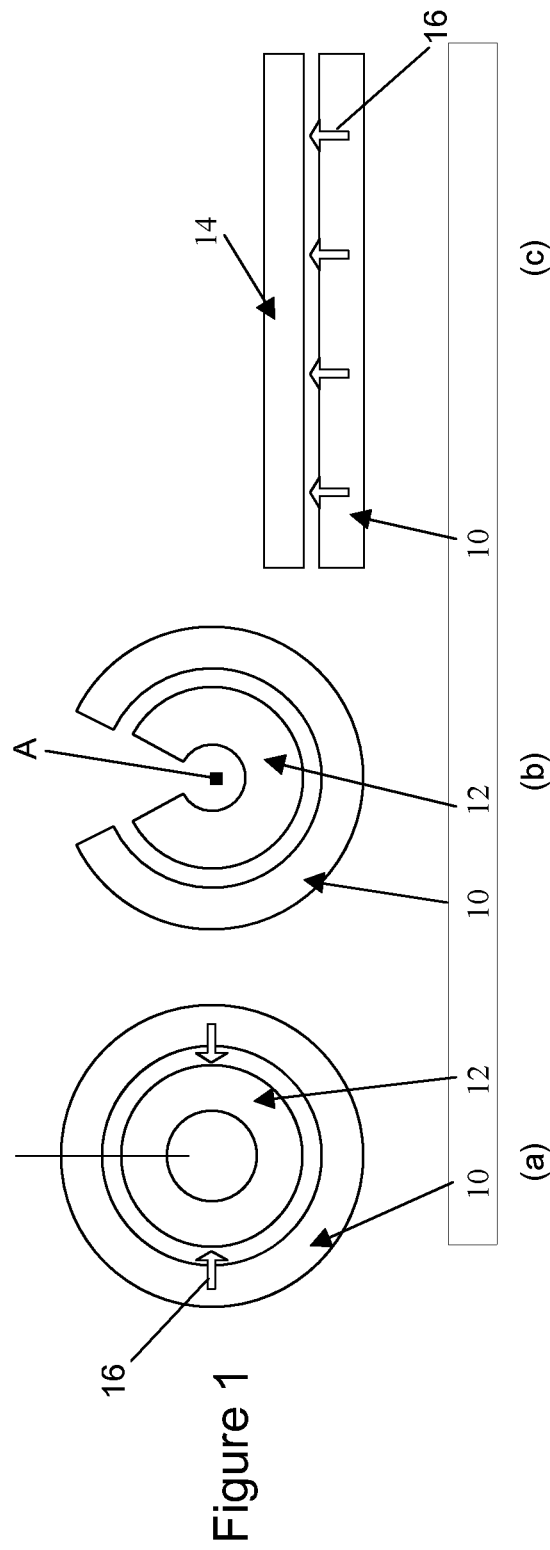
FIGS. 1(a) to (c) show schematically the components of a rotary and a linear electrical machine.
Figure 2:
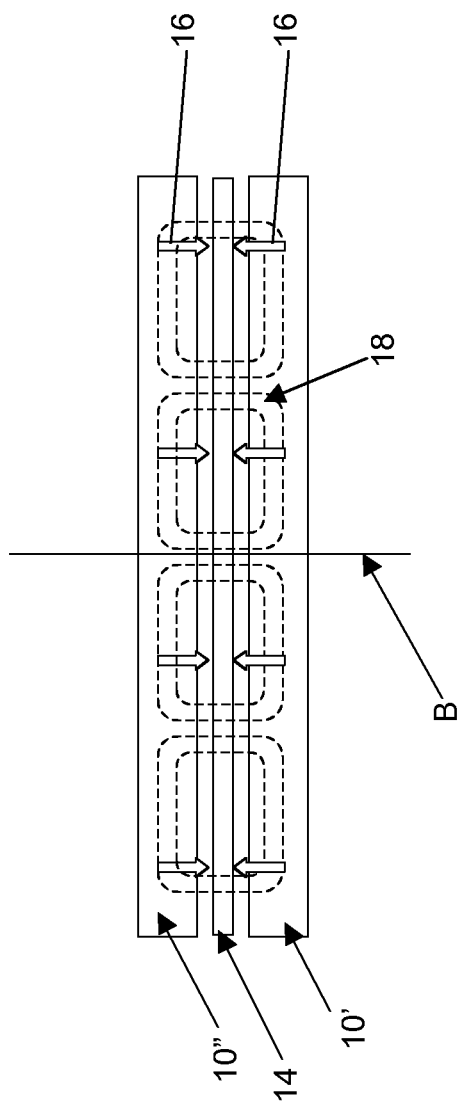
FIG. 2 shows a two-stator linear machine.
Figure 4:
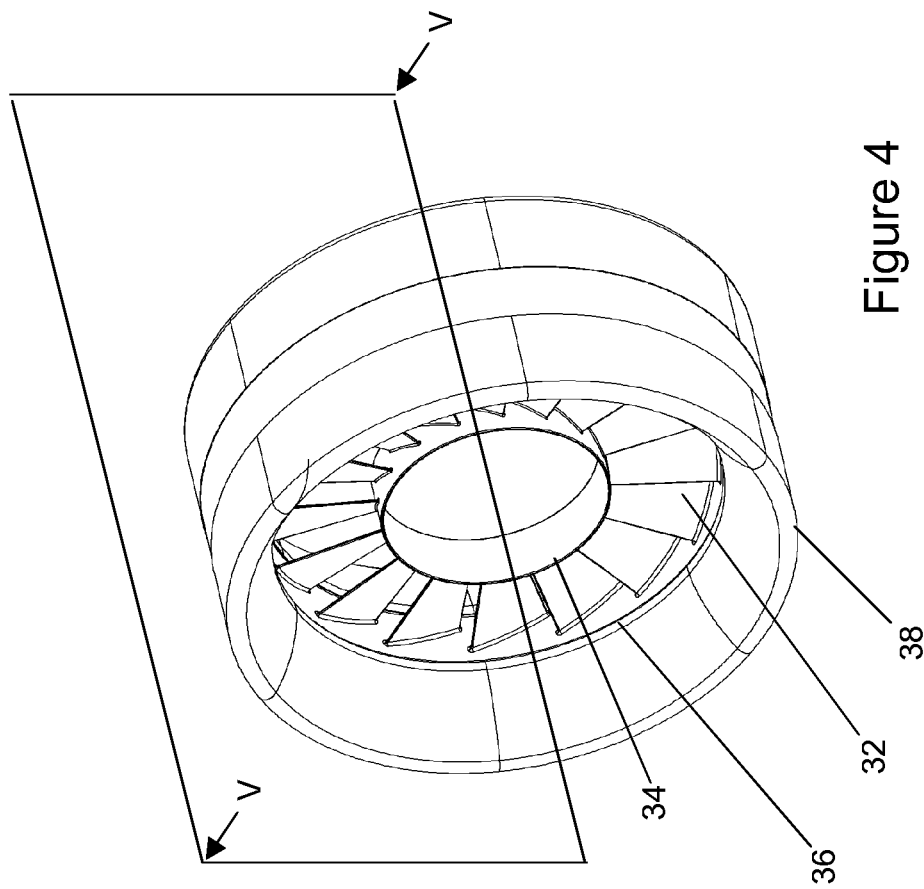
FIG. 4 shows a perspective view of the housing of FIG. 3.
Figure 3:
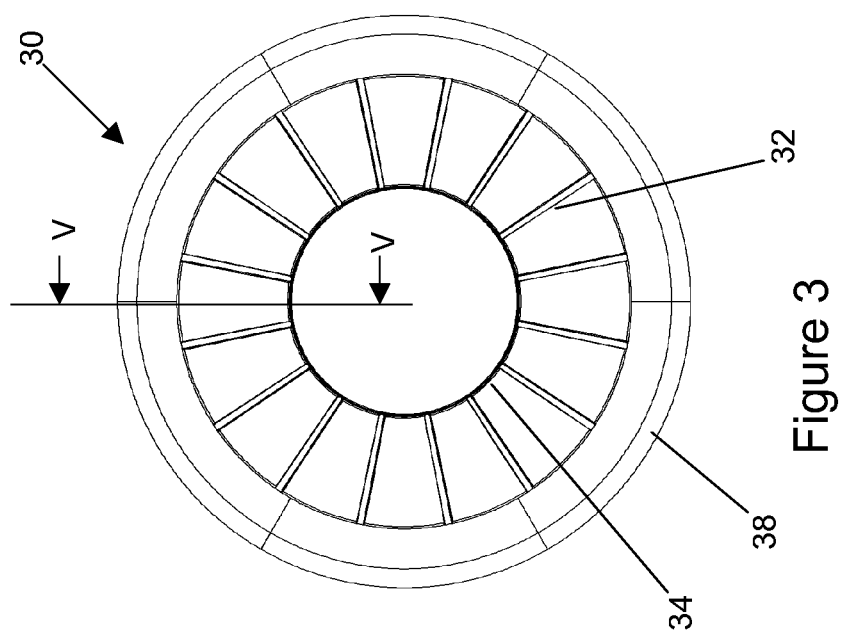
FIG. 3 shows in elevation a housing for an open centered hydro-turbine including an electrical generator according to an embodiment of the present invention.

One particular application for the present invention is an axial-flux, low-speed, direct-coupled, rotary generator for use in an open-centre, shaftless tidal-current turbine. Referring now to FIGS. 3 and 4, there is shown such a turbine 30 including an electrical motor/generator according to an embodiment of the present invention. The turbine comprises a runner, comprising a set of blades 32 that are fixed between an inner ring 34 and an outer ring 36, housed in a shroud 38. Typically, the turbine housing also includes mounts which allow the turbine to be secured to a subsea structure such as a gravity base—although this detail is not shown in the present case.

Figure 5:
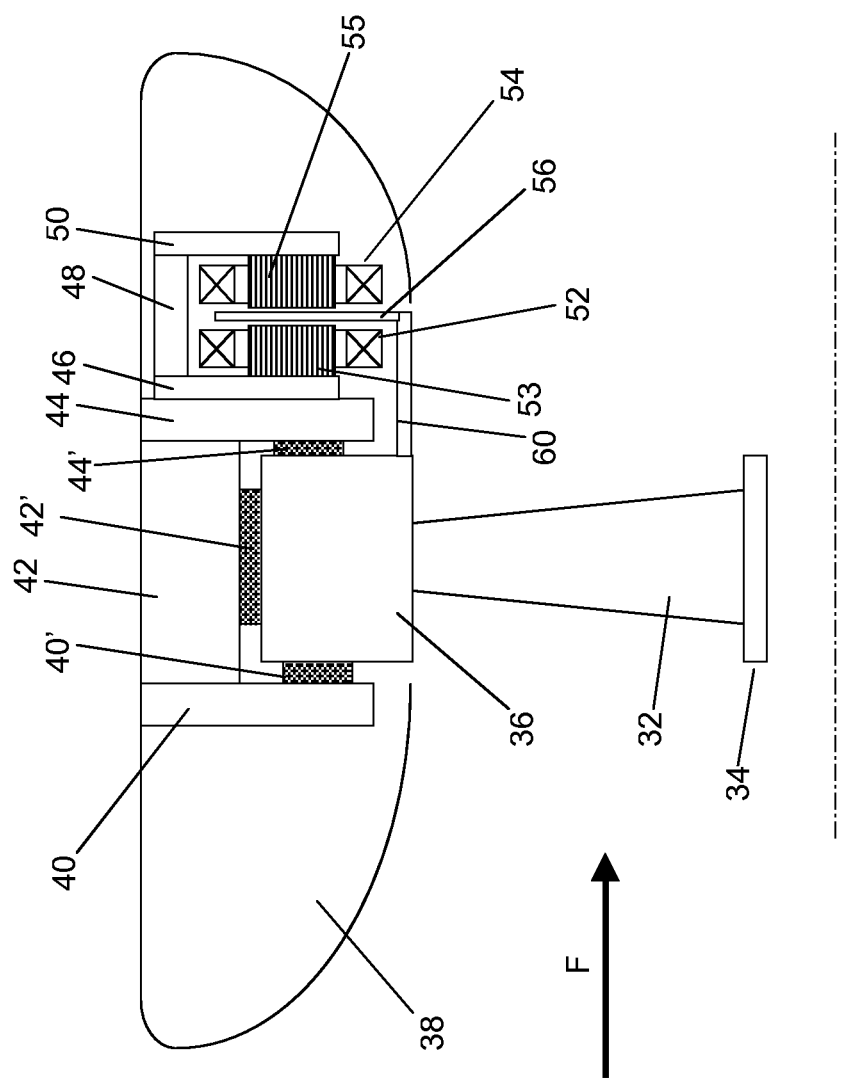
FIG. 5 is a cross-sectional view through the line V-V and the plane V-V indicated in FIGS. 3 and 4.

Turning now to FIG. 5 which shows a portion of the turbine in cross-section. The outer ring 36 runs within a channel defined by a front annular support 40, an outer cylindrical support 42 and a rear annular support 44—front and rear being defined relative to the movement of fluid through the turbine indicated by the arrow F. Nonetheless, it will be appreciated that the turbine can be bidirectional and so responsive to fluid flow in either direction. Each support 40, 42, 44 is separated from the ring 36 by a respective bearing 40', 42', 44'. In the embodiment, none of these components need be magnetic and can be designed purely from a mechanical transmission efficiency point of view.

In this embodiment, a motor/generator assembly is disposed axially away from the turbine assembly. The motor/generator assembly again comprises a front annular support 46, a cylindrical outer support 48 and a rear annular support 50. The front annular support 46 can be fixed to the rear annular support 44 or indeed these can be produced as an integral component. A first circular stator comprises a set of coils 52 wound around a circular laminate 53 as described in more detail below and the laminate 53 is fixed to the front support 46. A second circular stator comprises a set of coils 54 wound around a circular laminate 55 again as described in more detail below and the laminate 55 is fixed to the rear support 50. An annular rotor 56 is disposed between the two stators 52, 54 and this motor/generator rotor 56 is directly coupled to the outer ring 36 of the runner via a transmission ring 60. Thus, when the motor/generator 52, 54, 56 is driven to start the turbine, rotation is transmitted to the runner via the ring 60, and once running, the runner drives the motor/generator via the ring 60. It will nonetheless be appreciated that in the right tidal conditions, tidal flow could be used to start the turbine without the need to kick-start the turbine electrically. However, the possibility of kick-starting the turbine means that it can operate across a greater range of conditions including low flow conditions than if this option were not available.

Figure 6:
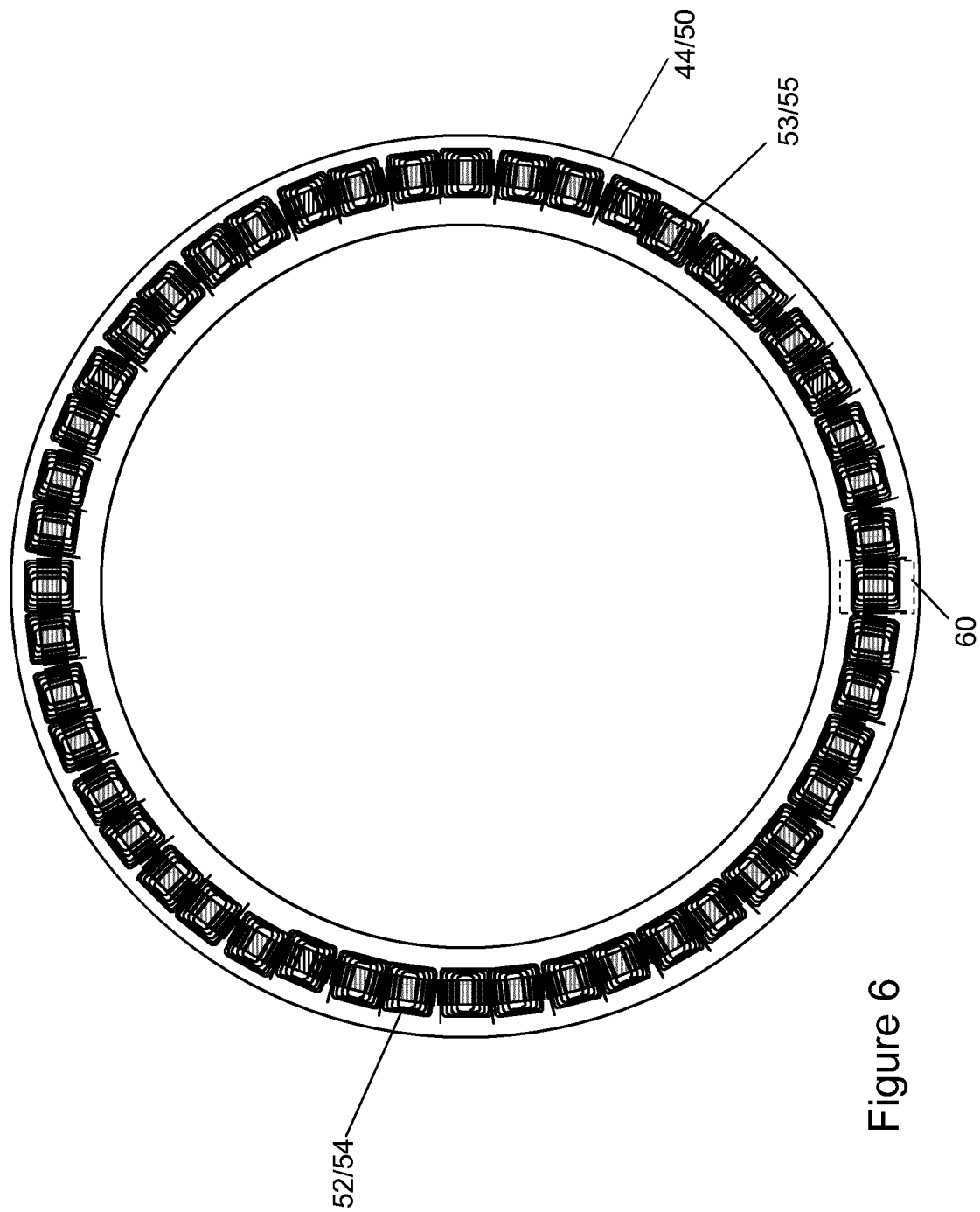
FIG. 6 shows an exemplary layout of windings on a stator for the turbine of FIGS. 3-5.

FIG. 6 shows the construction of the stators 52, 54 of FIG. 5 in more detail. In some applications, the stator could have a mean diameter of 9 m and in this case a pole number of 48, i.e. the winding 53, 55 on each stator 52, 54 is a single-phase 48-pole arrangement. While it will be appreciated that the second stator 54 is identical to and facing the first 52, in a 48 pole arrangement it is circumferentially displaced from the first by an angle of 3.75° which is half of a pole pitch.

In one embodiment, the winding of each stator is formed from 12 lengths of insulated cable laid into 864 slots. FIG. 7*a* illustrates the first stage 60(1) of the cable layout for one pole 60, where the number of slots per pole has been reduced from 18 to 10 in order to simplify the illustration. Cable laying progresses in a helical manner from the outside to the inside to form a single-layer, 9-turn, planar coil. Cable laying then proceeds as shown dotted in FIG. 7(*a*) and a second layer 60(2) is formed in the same slots in the pattern shown in FIG. 7(*b*), which finishes at the outside. On completion of the second layer, cable laying may proceed to form two further layers in the same slots. Alternatively, cable laying may proceed to form two layers on an adjacent pole. In the present example, each of the 12 lengths of cable is used to form a total of 16 pairs of layers and these may be arranged as 2 layers on each of 16 poles, 4 layers on each of 8 poles or 8 layers on each of 4 poles. It will be seen that the two ends of each length of cable are situated on the outside of the windings and so it is convenient to provide sufficient spare length to reach an electrical equipment enclosure (not shown) where the cable ends may be passed through water-tight glands. This arrangement is favourable for subsea use as it avoids any cable joints or splices that are expensive to form and are vulnerable points where electrical faults could occur. The 12 lengths of cable may be connected in parallel to a common single-phase ac source or they may be isolated and connected to separate independent single-phase sources so that in the event of a cable failure or failure of a source, the system can continue to operate.

Each of the stator cores 53, 55 is ideally a continuous laminated ring that could be formed from a continuous spiral of electrical steel sheet. However a continuous ring of the required dimensions could be unwieldy and in some applications, it is preferred to divide the core into a number of arcs or short straight lengths that assemble to form a polygon. In the present example, the preferred arrangement has 12 arcs or straight lengths and the cable winding is formed as four poles of eight layers on each. The winding may therefore be formed before the core sections are assembled to form the complete stator ring (or polygon).

Figure 8:
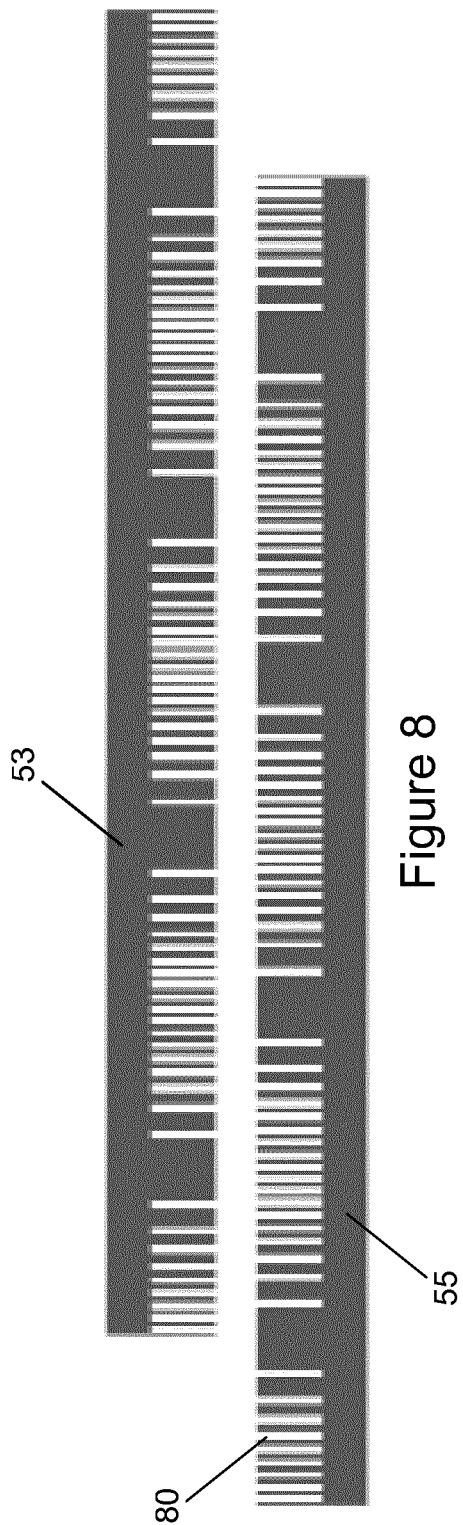
FIG. 8 shows a cross-section of an exemplary laminate for accommodating the windings of FIGS. 6 and 7.

In one embodiment, slots 80 are distributed as shown in FIG. 8 with positions selected to give progressively higher concentrations of turns further from the pole axes, giving a good approximation to a sinusoidal current distribution. FIG. 8 shows sections from the two stators facing each other and displaced by a half pole pitch.

Figure 9:
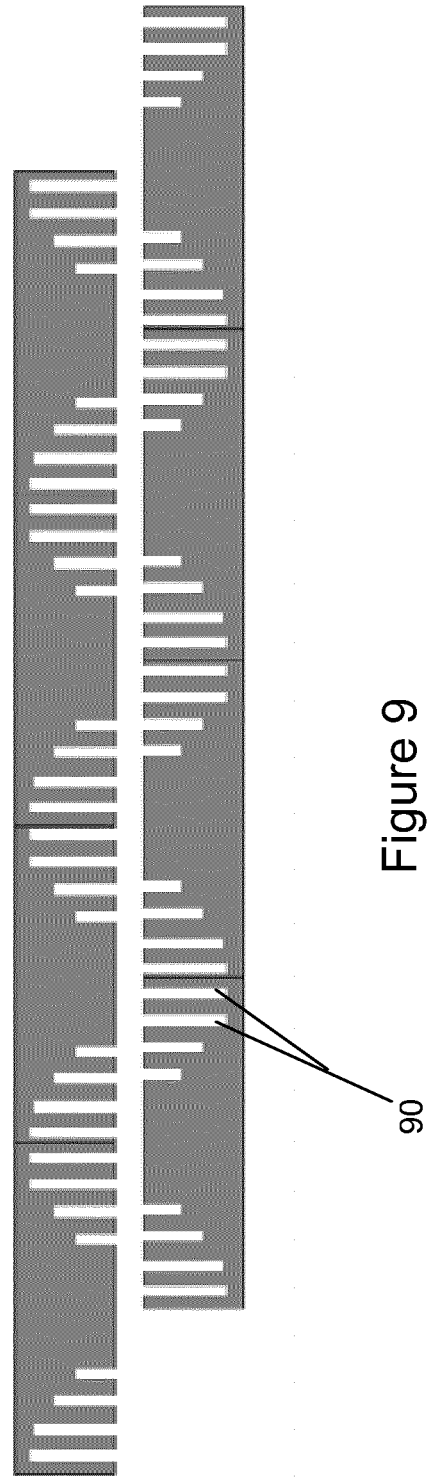
FIG. 9 shows a cross-section of an alternative laminate for accommodating windings for a stator.

In alternative arrangements, the slots can be arranged in a uniform array of slots but with each slot containing different numbers of turns. This can be achieved by omitting some of the inner loops of cable around each pole for the first few layers. In this case, the slot depth may differ according to the number of turns allocated or the slots may be all of the same depth and those containing fewer turns may contain inert packing. The illustration in FIG. 9 shows a lamination with deep slots 90 furthest from the pole axis which could contain 8 layers of cable. The first two layers of the winding for each pole would have 2 loops. Closer to the pole axis, shallower slots allow the next two layers to have 3 loops and the last four layers contain 4 loops.

A combination of the approach shown in FIGS. 8 and 9 for achieving a sinusoidal distribution could also be adopted. The benefit of achieving a close approximation to a sine wave is the reduction in losses associated with space harmonic components of the current distribution. Harmonic components give rise to flux components that rotate at speeds different from the speed of the fundamental and induce unwanted currents within the rotor leading to additional losses.

Figure 10:
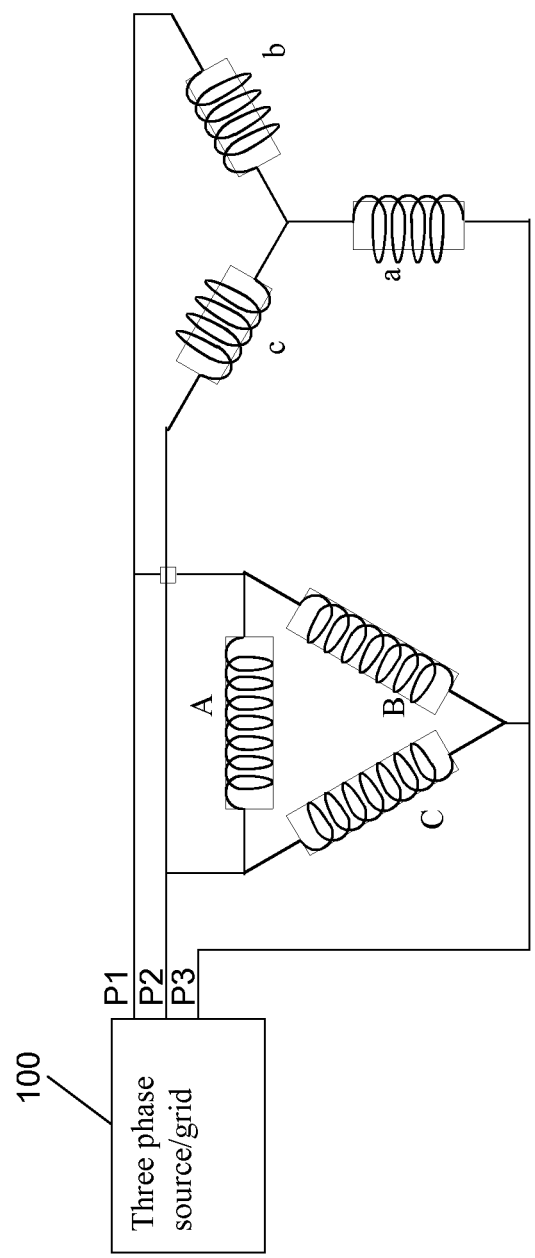
FIG. 10 shows an electrical connection for the windings of the two stators arranged to operate with a standard three-phase electrical system.

FIG. 10 is an electrical diagram showing an exemplary electrical system for the generator. In one implementation, three windings a, b and c are connected in star to the source/grid 100 and are housed with one stator; whereas a second set of windings A, B and C are connected in delta to the source/grid and housed with the other stator. Each stator structure is split into sections with the sections arranged so that the travelling magnetic field within the machine induces single phase alternating emf in the sections displaced in phase by 120 electrical degrees. Thus, each winding a, b, c, A, B, C is connected to a respective section of each stator. The delta-connected windings A, B, C should have approximately $\sqrt{3}$ times as many turns as those in star connection because they operate with the same magnetic flux but at $\sqrt{3}$ times higher voltage. However they carry only $1/\sqrt{3}$ as much current to deliver the same power and so their windings may be of correspondingly smaller cross section.

Figure 11:
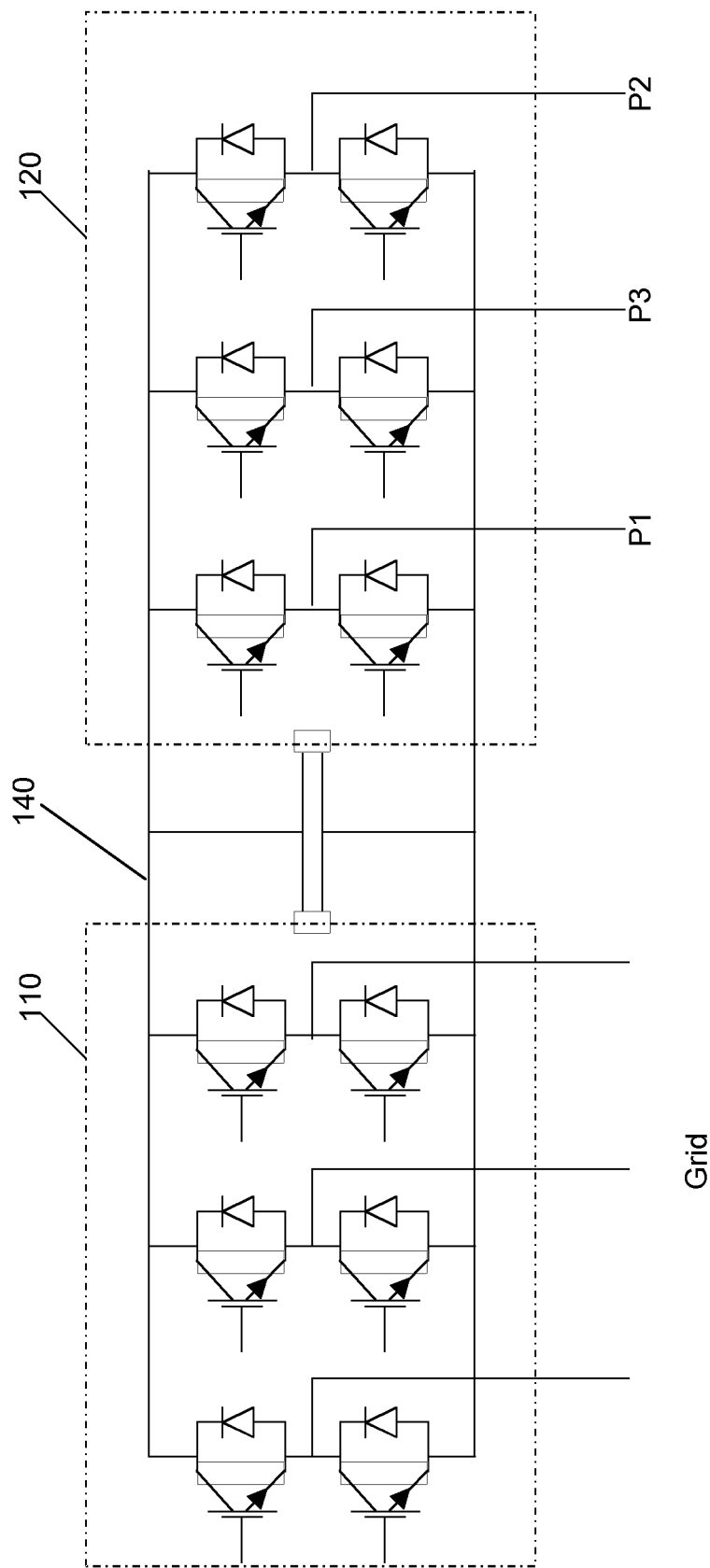
FIG. 11 shows a two-bridge converter for use with the system of FIG. 10.

Exemplary power conversion circuitry 100 comprising a voltage-source inverter is described in PCT/EP2012/065701. FIG. 11 in particular shows a two-bridge converter where both a first stage converter 110 and a second stage converter 120 comprise a 3-phase voltage source inverter connected via a DC link 140. The phase ports of the first stage 110 are connected to the source/grid, whereas the phase ports P1, P2, P3 of the second stage 120 are connected to the stator blocks as shown in FIG. 10.

Figure 12:
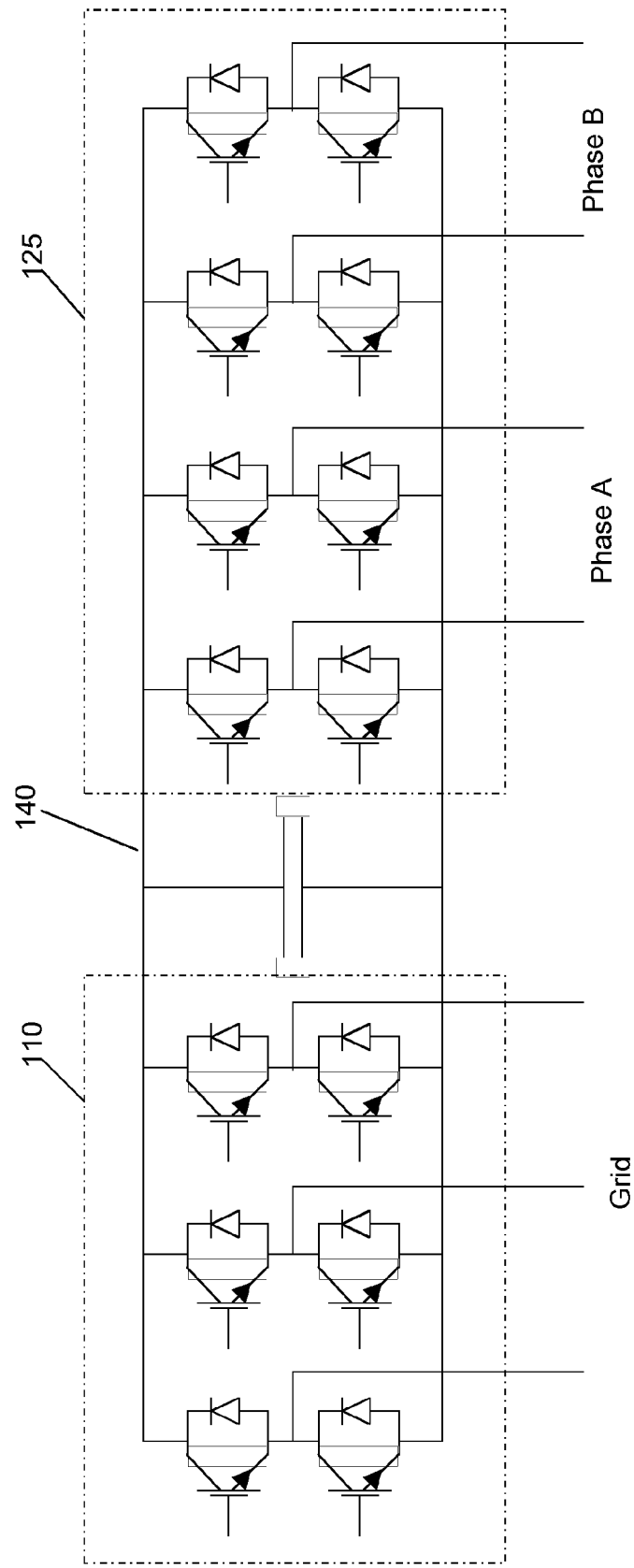
FIG. 12 shows a converter providing a two-phase output for use in alternative implementations of the invention.

Referring now to FIG. 12, in other implementations, each stator's single phase winding can be connected to a power converter 110,140,125 comprising a respective H bridge that converts a dc source 140 to a single-phase ac source, phase A and phase B, the dc ports of the two H bridges 125 being connected to a common dc source 140 and their ac ports being arranged to provide voltages phase A and phase B, that differ in phase.

The rotor 56 is an annular sheet or plate of electrical conductor that rotates in the gap between the two stators as illustrated in FIG. 5. In The annulus may be fabricated from several arcs or trapezoidal sheets. It is best to avoid using a number of sheets equal to the number of stator sections so that any torque pulsations created by the joints tend to mutually cancel.

The invention claimed is:

1. A power generator for a hydro turbine, the power generator being axially coupled to the hydro turbine and comprising a rotor arranged to rotate about an axis in response to fluid flow through said turbine, a first stator structure incorporating a first winding disposed circumferentially around the axis and axially displaced in a first inboard direction from the rotor, and a second stator structure incorporating a second winding disposed circumferentially around the axis and axially displaced in a second outboard direction from the rotor, the rotor being arranged to electrically couple with the windings, wherein each of said first and second windings is a single phase winding, each of said first and second stators comprising a plurality of laminates having a plurality of slots for accommodating said first and second windings respectively, and wherein the respective slots of each of said first and second stators are non-uniformly spaced apart with the spacing between successive slots being progressively increased and then progressively decreased to create an approximately sinusoidal distribution of said slots.

2. The power generator of claim 1, wherein the power generator is a direct drive generator.

3. The power generator of claim 2, wherein the power generator is connected to a two-stage converter comprising a first stage having one port arranged to connect to a grid and a second port arranged to connect to a DC link and a second stage having one port arranged to connect to the DC link and a second port arranged to connect to the windings of the stator.

4. The power generator of claim 3, wherein the first stage converter is a 3-phase voltage source inverter and the second stage is a 3-phase voltage source inverter.

5. The power generator of claim 4, wherein the second stage converter is connected to three outboard stator blocks in a delta configuration and three inboard stator blocks in a star configuration.

6. The power generator of claim 4, wherein the second stage converter is connected to three outboard stator blocks in a star configuration and three inboard stator blocks in a delta configuration.

7. The power generator of claim 3, wherein the first stage converter is a 3-phase voltage source inverter and the second stage is a double H-Bridge providing a 2-phase output.

8. The power generator of claim 3, wherein said respective single phase windings provide for a single-phase connection to the converter.

9. The power generator of claim 8, wherein the single phase winding is a cable winding.

10. The power generator of claim 1, wherein the at least a first winding of the first stator structure is tangentially displaced from the at least a first winding of the second stator structure.

11. The power generator of claim 1, wherein the generator is an induction generator.

12. The power generator of claim 1, wherein the generator is a permanent-magnet generator.

13. The power generator of claim 1, wherein said hydro turbine is an open-centre, shaftless tidal-current turbine.

14. The power generator of claim 1, wherein, for each of said first and second stators, a respective group of said slots is provided for each pole of the generator, the spacing between adjacent slots of each group becoming progressively smaller in a direction towards a centre of the respective group.

15. A power generator for a hydro turbine, the power generator being axially coupled to the hydro turbine and comprising a rotor arranged to rotate about an axis in response to fluid flow through said turbine, a first stator structure incorporating a first winding disposed circumferentially around the axis and axially displaced in a first inboard direction from the rotor, and a second stator structure incorporating a second winding disposed circumferentially around the axis and axially displaced in a second outboard direction from the rotor, the rotor being arranged to electrically couple with the windings, wherein each of said first and second windings is a single phase winding, each of said first and second stators comprising a plurality of laminates having a plurality of slots for accommodating said first and second windings respectively, and wherein the respective slots of each of said first and second stators are uniformly spaced apart with successive slots accommodating a progressively higher number of turns of the respective first or second winding and then progressively lower number of turns of the respective first or second winding to create an approximately sinusoidal distribution of turns in said slots.

* * * * *